(12) United States Patent
Vulkan et al.

(10) Patent No.: US 9,403,432 B2
(45) Date of Patent: Aug. 2, 2016

(54) ROLL OVER VALVE

(75) Inventors: Omer Vulkan, D. N. Hanagev (IL);
Vladimir Olshanetsky, Beer Sheva (IL);
Alon Rahamim, Beer-Sheva (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 18 days.

(21) Appl. No.: 13/820,231

(22) PCT Filed: Aug. 31, 2011

(86) PCT No.: PCT/IL2011/000698
§ 371 (c)(1),
(2), (4) Date: Mar. 1, 2013

(87) PCT Pub. No.: WO2012/029062
PCT Pub. Date: Mar. 8, 2012

(65) Prior Publication Data
US 2013/0153051 A1    Jun. 20, 2013

Related U.S. Application Data

(60) Provisional application No. 61/379,576, filed on Sep. 2, 2010.

(51) Int. Cl.
*F16K 24/04* (2006.01)
*B60K 15/035* (2006.01)
(Continued)

(52) U.S. Cl.
CPC ......... *B60K 15/035* (2013.01); *B60K 15/03519* (2013.01); *F16K 24/00* (2013.01); *B60K 2015/03296* (2013.01); *Y10T 137/3099* (2015.04)

(58) Field of Classification Search
CPC ............. Y10T 137/053; Y10T 137/0777; Y10T 137/7772; Y10T 137/7779; Y10T 137/778; Y10T 137/0826; Y10T 137/0874; Y10T 137/3099; Y10T 137/6004; Y10T 137/7358; Y10T 137/86324; Y10T 137/86332; B60K 2015/03289; B60K 2015/03388; B60K 15/03519; B60K 2015/03296; B60K 15/035; F16K 24/00; F16K 24/04; F16K 24/042; F16K 24/044; F16K 24/046; F16K 24/06; F16K 17/42; F02M 37/0082; F01N 2610/1466; F01N 2610/1413
USPC ............ 137/39, 43, 202, 493.1, 493.8, 493.9, 137/587, 15.26, 315.08, 41, 409, 588, 137/614.16–614.18, 519, 532, 533, 512.2
See application file for complete search history.

(56) References Cited

U.S. PATENT DOCUMENTS 2,990,842 A * 7/1961 Good .............................. 137/202
3,867,071 A * 2/1975 Hartley ....................... 417/211.5
(Continued)

FOREIGN PATENT DOCUMENTS

EP    1782992 A1    5/2007

OTHER PUBLICATIONS

International Search Report for corresponding application PCT/IL2011/000698 filed Aug. 31, 2011; Mail date Dec. 5, 2011.
(Continued)

*Primary Examiner* — Craig J Price
(74) *Attorney, Agent, or Firm* — Cantor Colburn LLP

(57) ABSTRACT

A valve for a fuel tank is provided, comprising a housing configured with a float chamber and a disk chamber being in flow communication through an intermediate flow path. The disk chamber is configured with a fluid outlet port from the intermediate flow path and a valve outlet and a fluid inlet port is sealable by a sealing member of a float member axially displaceable within the float chamber to selectively facilitate fluid flow to or from the float chamber via the valve. The fluid outlet port is sealable by a pressure holding member axially having an under pressure bleed valve displaceable between a sealed position wherein the under pressure bleed valve is sealed, and an open position wherein the under pressure bleed valve is open, providing passage of fluid therethrough.

19 Claims, 9 Drawing Sheets

(51) Int. Cl.
*F16K 24/00* (2006.01)
*B60K 15/03* (2006.01)

(56) References Cited

U.S. PATENT DOCUMENTS

| | | | | |
|---|---|---|---|---|
| 4,886,089 A | * | 12/1989 | Gabrlik et al. | 137/202 |
| 5,313,977 A | * | 5/1994 | Bergsma et al. | 137/43 |
| 5,582,198 A | * | 12/1996 | Nagino et al. | 137/43 |
| 5,738,132 A | | 4/1998 | Zakai et al. | |
| 6,240,950 B1 | * | 6/2001 | Harris | 137/202 |
| 6,564,821 B1 | | 5/2003 | Orenstein et al. | |
| 7,201,155 B2 | * | 4/2007 | Mills | 123/509 |
| 7,219,683 B2 | * | 5/2007 | Furuya et al. | 137/202 |
| 7,543,597 B2 | * | 6/2009 | Leonhardt | 137/202 |
| 7,886,780 B2 | * | 2/2011 | Falligant et al. | 141/198 |
| 7,931,452 B2 | * | 4/2011 | Hibino et al. | 137/493.9 |
| 2005/0126633 A1 | | 6/2005 | Leonhardt | |
| 2006/0108000 A1 | | 5/2006 | Kaneko et al. | |
| 2006/0213553 A1 | * | 9/2006 | Mills et al. | 137/43 |
| 2007/0102043 A1 | * | 5/2007 | Ehrman et al. | 137/202 |
| 2009/0071543 A1 | | 3/2009 | Vulkan et al. | |

OTHER PUBLICATIONS

Written Opinion for corresponding application PCT/IL2011/000698 filed Aug. 31, 2011; Mail date Dec. 5, 2011.

* cited by examiner

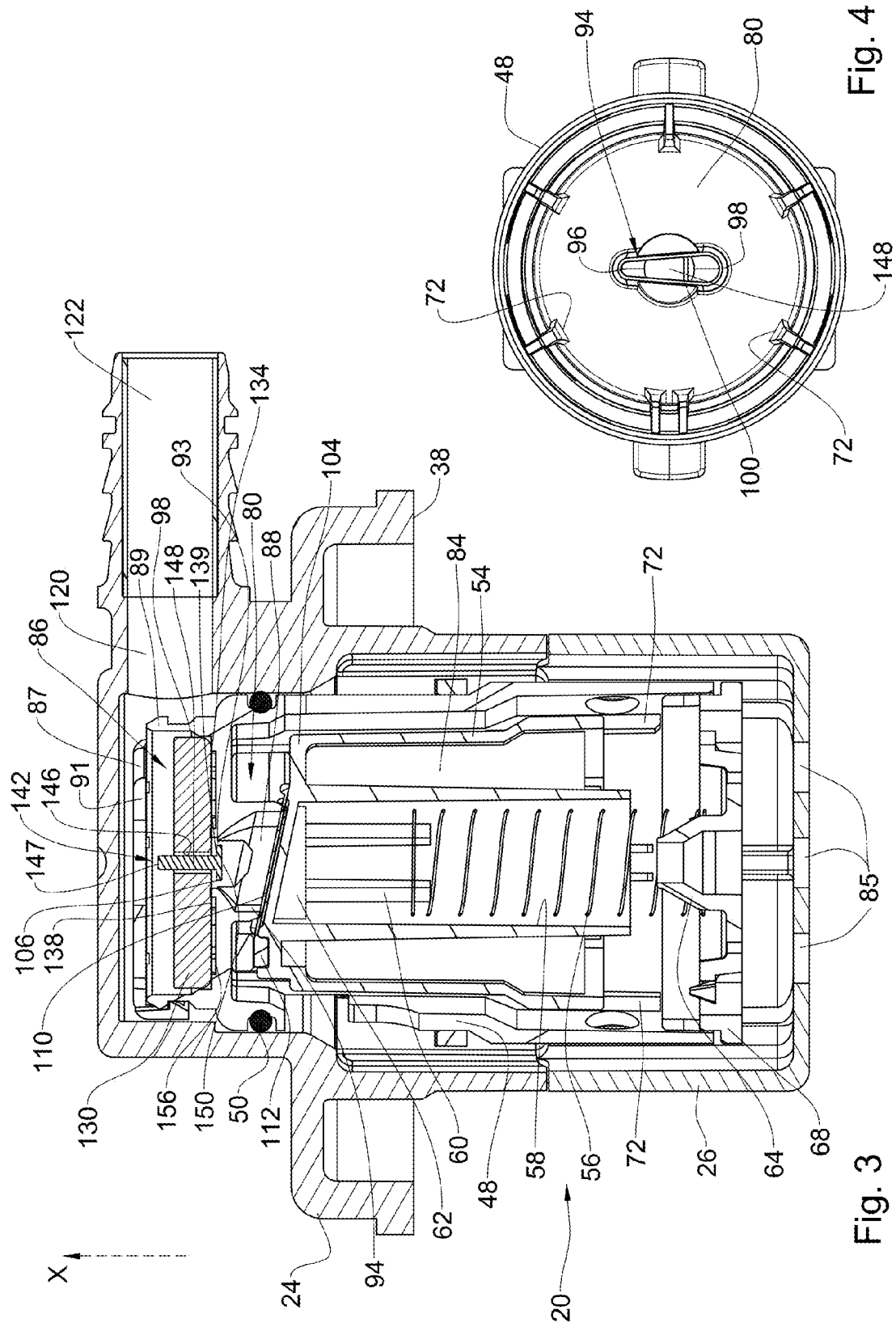

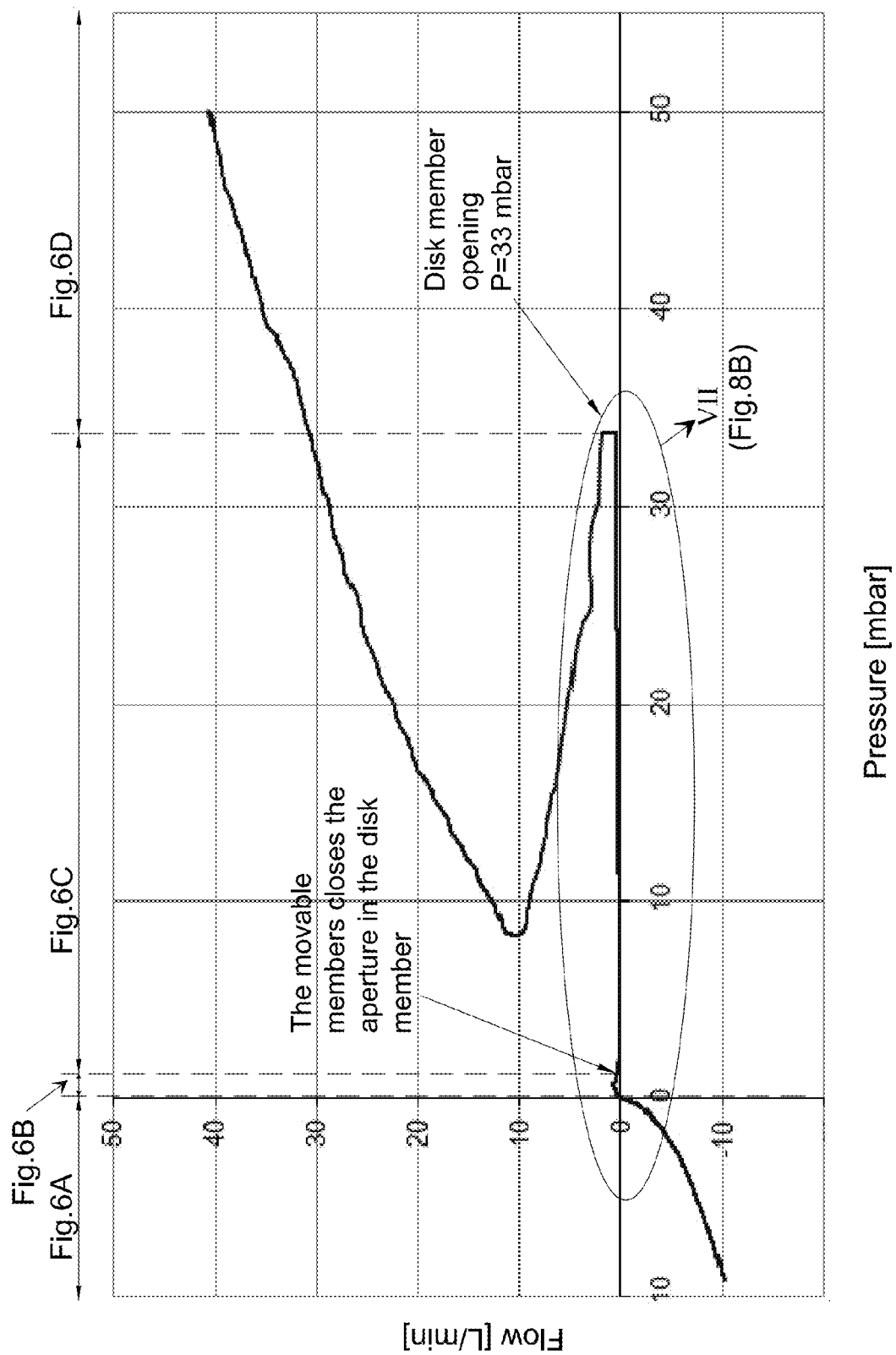

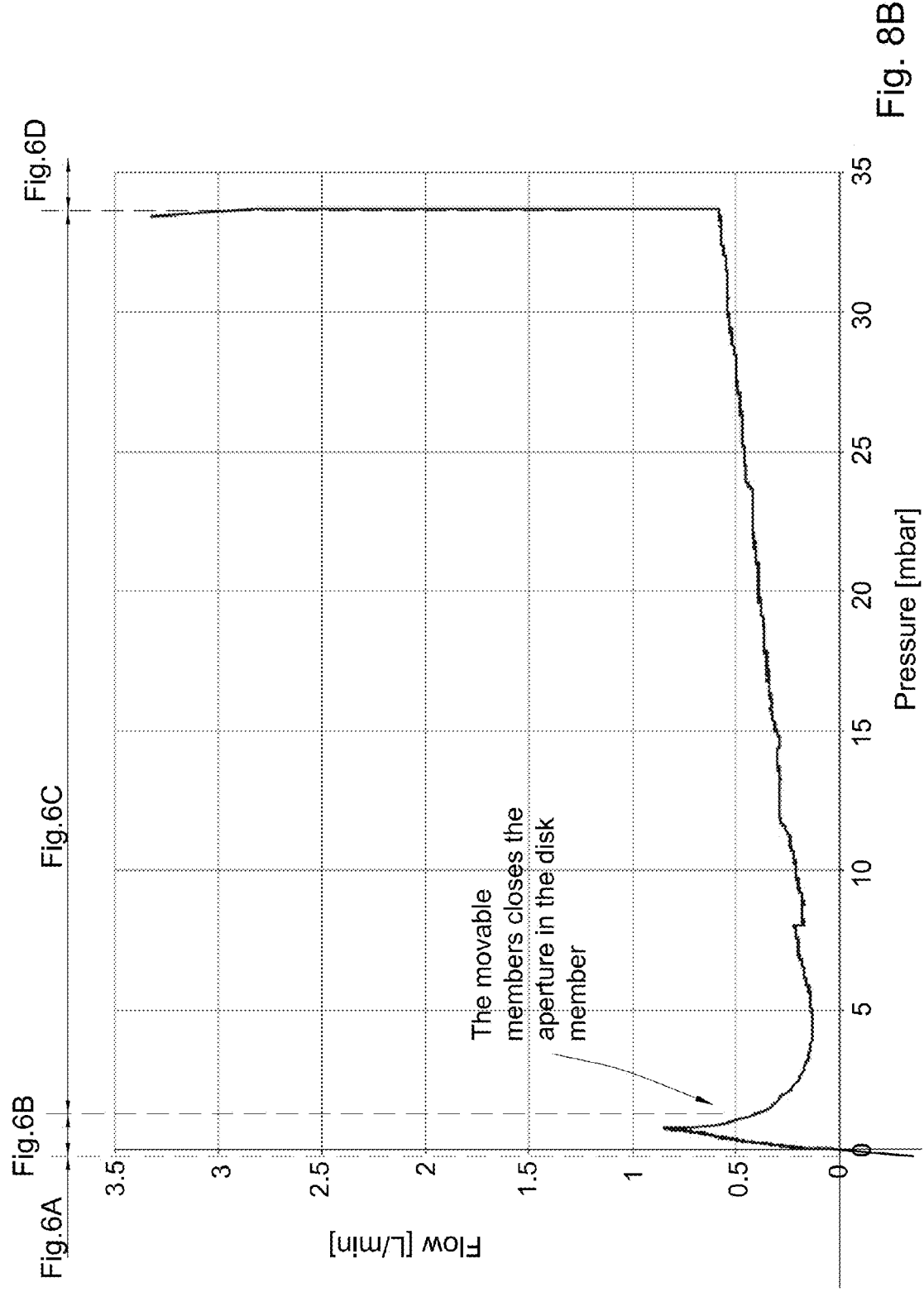

ROLL OVER VALVE

FIELD OF THE DISCLOSED SUBJECT MATTER

This disclosed subject matter relates to a roll over fuel valve and more particularly to such a valve fitted with a Holding Pressure Function (HPF) and an Under Pressure Relief (UPR) function.

BACKGROUND OF THE PRESENTLY DISCLOSED SUBJECT MATTER

Rollover vent valves are widely used and are well known.

For example, U.S. Pat. No. 5,738,132 discloses a roll over vent valve comprising a housing having a fluid inlet and a fluid outlet, the latter comprising a substantially elongated sliT-shaped outlet aperture of the housing bounded by a valve seating. There is furthermore provided a float member located in the housing and axially displaceable within the housing between the inlet and the outlet; an elongated flexible closure membrane strip anchored at one end thereof to an end of the float member adjacent the outlet and at a portion thereof offset with respect to the outlet; spring biassing means located within the housing and bearing on the float member so as to spring bias it in the direction of the outlet; whereby the spring biassing together with buoyancy forces acting on the float member tend to press the membrane strip into sealing engagement with the outlet aperture whilst gravity forces acting on the float member tend to displace the float member away from the outlet so as to progressively detach the strip from sealing engagement with the outlet US2009071543 discloses a fuel valve comprising a primary valve and a pressure responsive auxiliary valve, both being axially accommodated and displaceable within a common housing formed with a fluid inlet and a fluid outlet port, and a partition extending between the primary valve and the auxiliary valve. The partition comprising a flow passage extending between a primary port at a bottom face of the partition and an auxiliary port at a top face of the partition. The primary port is sealable by a sealing member of the primary valve and the auxiliary port sealable by a sealing member of the auxiliary valve.

SUMMARY OF THE PRESENTLY DISCLOSED SUBJECT MATTER

The present disclosed subject matter is directed to a Roll Over Valve (ROV) fitted with a Holding Pressure Function (HPF) and an Under Pressure Relief (UPR) function.

In accordance with a first aspect of the presently disclosed subject matter there is provided a valve for a fuel tank. The valve comprises a housing configured with a float chamber and a disk chamber being in flow communication through an intermediate flow path. The float chamber is configured with: a valve inlet which is in fluid communication with the fuel tank; and a fluid inlet port into said intermediate flow path. The disk chamber is configured with a fluid outlet port from said intermediate flow path and a valve outlet. The fluid inlet port is sealable by a sealing member of a float member axially displaceable within the float chamber to selectively facilitate fluid flow to or from the float chamber via the valve, and the fluid outlet port is sealable by a pressure holding member axially displaceable within the disk chamber to selectively facilitate fluid flow into or out of said fluid outlet port. The pressure holding member is configured with an under pressure bleed valve that is displaceable between a sealed position wherein the under pressure bleed valve is sealed, and an open position wherein the under pressure bleed valve is open, providing passage of fluid therethrough.

The under pressure bleed valve can be in the form of an aperture formed in the pressure holding member and a movable member displaceable within the aperture responsive to pressure differential and fluid flow rate between an open position, corresponding to the open position of the under pressure bleed valve, in which said aperture is open to facilitate fluid flow through said aperture, and a sealed position, corresponding to the sealed position of the under pressure bleed valve, in which the aperture is sealed.

The movable member can be a separate member which is mechanically disconnected from said pressure holding member. The movable member can be freely accommodated within said aperture.

The movable member can comprise a head portion and a main portion.

The movable member can be an inverted restricting pin having a cross-sectional T-shape.

The head portion can have a diameter which is larger than the diameter of the aperture. In the sealed position of the under pressure bleed valve, said head portion bears against a bottom surface of the pressure holding member.

The main portion can be characterized by an elongated shape and having a diameter which is smaller than the diameter of said aperture so as to allow passage of fluid therebetween.

The under pressure bleed valve can be disposed within said pressure holding member.

In the open position of the under pressure bleed valve, the head portion is displaced downwardly, towards the intermediate flow path, where it facilitates restricted fluid flow through said aperture of the pressure holding member.

The pressure holding member can be a disk member displaceable within the disk chamber between an open position in which it provide passage about the sealing boundaries and a closed position in which it rests over the sealing boundaries of the fluid outlet port, so as to selectively facilitate fluid flow out of the fluid outlet port into the disk chamber.

The valve can have an under pressure position in which said disk member is disposed at its closed position, preventing passage of fluid about the sealing boundaries thereof, and in which the disk member is in the open position in which it facilitates fluid flow from the disk chamber through the under pressure bleed valve into the float chamber. The under pressure position can take place at $P_{tank}<0$ KPa, for providing fluid bleeding into the fuel tank, via the valve inlet, at a flow rate Q>1 l/min.

The valve can have an outlet bleed position in which said disk member is disposed at its closed position, providing fluid bleed about the sealing boundaries thereof, and in which the disk member is in the open position in which it facilitates fluid flow from the float chamber into the disk chamber through the under pressure bleed valve. The outlet bleed position takes place at $0<P_{tank}<0.75$ mbar, for providing fluid flow from the fuel tank, through the intermediate flow path, about the sealing boundaries the pressure holding member and through the under pressure bleed valve, towards the valve outlet, at a flow rate of Q<0.85 l/mi.

The valve can have a transition open position in which said disk member is disposed at its closed position, providing fluid bleed about the sealing boundaries thereof, and in which the disk member is in the sealed position. The transition open position can take place at $0$ KPa$<P_{tank}<3$ KPa, for providing fluid flow from the fuel tank, through the intermediate flow path, about the sealing boundaries the pressure holding member, towards the valve outlet, at a flow rate of Q<0.5 l/min.

The valve can have a fully opened position in which said disk member is disposed at its open position, providing fluid bleed about the sealing boundaries thereof, and in which the disk member is in the sealed position. The fully opened position can take place at 3 KPa<$P_{tank}$<5 KPa, for providing fluid flow from the fuel tank, through the intermediate flow path, about the sealing boundaries the pressure holding member, towards the valve outlet, at a flow rate of Q>20 l/min.

The float member can be axially displaceable within the housing along a longitudinal axis X, and the sealing member of the float member can be configured as an elongated flexible closure membrane strip anchored at one end thereof to an end of the float member adjacent the fluid inlet port and at a portion thereof offset with respect to the fluid inlet port.

The float member can be connected to a spring which is configured to displace the float member away from the fluid inlet port and detach the strip from sealing engagement with the fluid inlet port.

The valve can have a roll over position in which said float member is displaced toward the fluid inlet port and seal it.

In the under pressure position, the outlet bleed position, the transition open position, and the fully opened position, said valve is not in said roll-over position.

At the roll over position, there can substantially be no fluid flow through the valve, and Q=0 l/min.

BRIEF DESCRIPTION OF THE DRAWINGS

In order to understand the invention and to see how it may be carried out in practice, embodiments will now be described, by way of a non-limiting examples only, with reference to the accompanying drawings, in which:

FIG. 3 is a longitudinal section of the valve of FIG. 1, sectioned along line II-II;

FIG. 4 is a bottom view of a partition member of the valve, illustrating an outlet port thereof;

FIG. 8A is a graph representing pressure versus flow parameters of the valve subject of the present disclosure, during operation; and FIG. 8B is an enlargement of the portion marked VII in FIG. 8A.

DETAILED DESCRIPTION OF EMBODIMENTS

Figure 1:
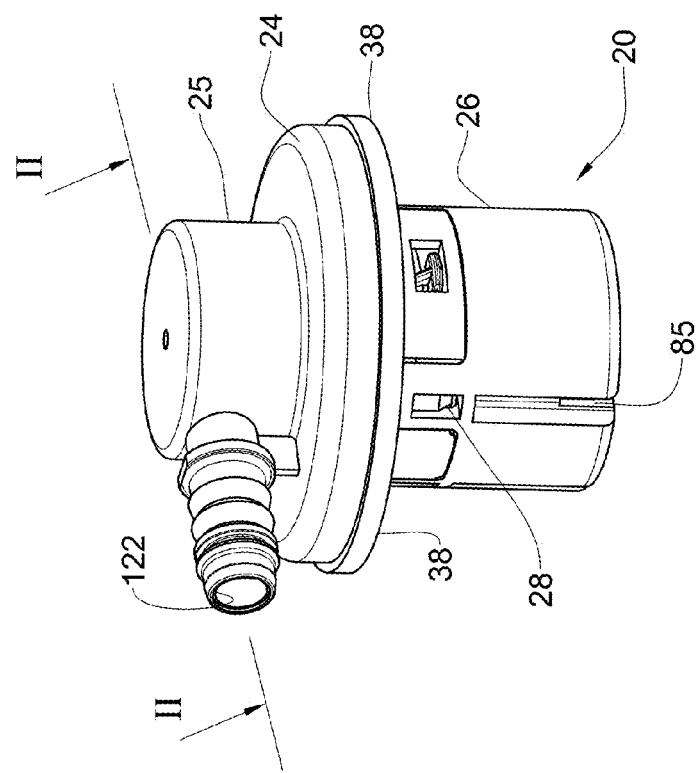
FIG. 1 is a top perspective view of a fuel valve in accordance with the present disclosed subject matter.

Attention is first directed to FIGS. 1 to 4 of the drawings illustrating a Roll Over Valve (ROV) generally designated 20. The valve 20 comprises a top housing element 24 and a bottom housing element 26, the two being snappingly engaged by several openings 28 formed at the bottom housing element 26 snappingly engageable by corresponding lateral projections 30 formed at the top housing element 24.

The bottom housing element 26 is substantially cylindrical and the top housing element 24 is configured with a lateral, downwardly extending skirt-like annular portion 38 configured for attachment over a top surface of a fuel tank (not shown) e.g. by heat welding.

Figure 2:
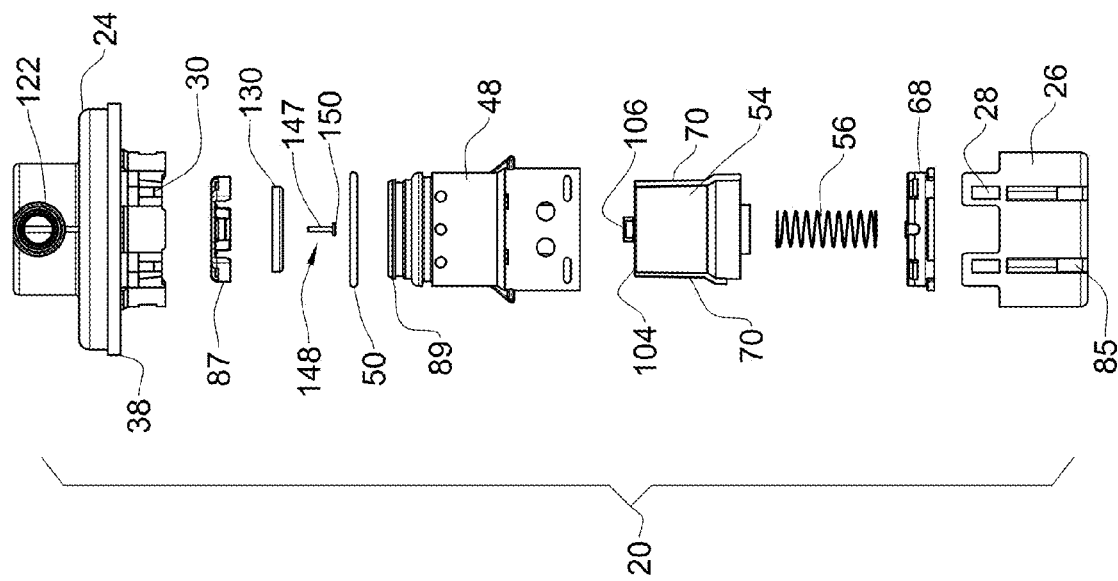
FIG. 2 is an exploded view of the valve seen in FIG. 1.

As can be seen in FIGS. 2 and 3, an inner capsule 48 securely received within the top housing element 24 at a press-fit configuration by means of an O-ring 50. The inner capsule 48 accommodates a float member 54 axially displaceable therein and being spring-biased in an downward direction (when the valve is in its resting position) by means of a coiled spring 56 received within a spring housing 58 of the valve (FIG. 3) and mounted at its upper end over a spring support 60, fitted for bearing against an upper spring bearing surface 62, where the spring's lower end bears upon a spring support 64 of a capsule bottom locking member 68, which in turn is snappingly engaged at a bottom of the inner capsule 48. The operation of the float member 54 is disclosed in U.S. Pat. No. 5,738,132, the content of which is incorporated by reference.

Float member 54 is provided with several longitudinal grooves 70 which respectively mate with longitudinal ribs 72 formed at inner walls of the inner capsule 48 thus restricting motion of the float member 54 only in a longitudinal direction (i.e. restricted to only up-down displacement whilst preventing any rotational displacement of the float member about its longitudinal axis X).

The inner capsule 48 is fitted at its upper portion with a partition wall 80 defining a lower, float chamber 84 accommodating the float 54 and an upper, disk chamber 86. The valve 20 is configured with a valve inlet in the form of a plurality of apertures 85 extending into the float chamber 84.

Extending between the float chamber 84 and the disk chamber 86 there is an intermediate flow path 88 through which the flow chamber 84 and the disk chamber 86 are selectively in flow communication with one another, as will be discussed hereinafter. A bottom end of the intermediate flow path 88, is configured with a fluid inlet port 94 (FIG. 4) in the form of a widening slit having rounded edges 96 and 98, in which fluid inlet port 94 defines a valve seating 100 inclined with respect to a longitudinal axis X of the float. It is noted that the fluid inlet port 94 extends substantially centrally at the bottom surface of the partition wall 80.

Formed centrally at an upper surface 104 of the float member 54 there is an inclined bearing surface 106, whose inclination with respect to the longitudinal axis X of the valve 20 (and respectively of the float member 54) corresponds to the inclination of the valve seating 100 of the fluid inlet port 94.

An elongated, strip-like, flexible membrane 110 is anchored at one extremity thereof via an anchoring stud 112 to the upper wall 104 of the float member 54 (which extends also with respect to the longitudinal axis X of the valve, whilst an opposed end of the strip-like membrane 110 is free).

The disk chamber 86 is in flow communication with the float chamber 84, via the intermediate flow path 88 and this flow path extends to a valve outlet 120 configured with a valve outlet port 122 coupleable to a suitable piping (not shown) e.g. connectable to a fuel treating device (canister) or any other suitable fuel device. The disk chamber 86 accommodates a pressure holding member in the form of a disk member 130 displaceable within the disk chamber 86 axially along the longitudinal axis X of the valve and displaceable between a closed position where sealing boundaries of the disk member 130 bear over an annular disk seating 134 and over an annular rim 138 of a fluid outlet port 139 of said intermediate flow path 88. The disk member 130 is configured to bear for substantial sealing of the fluid outlet port 139, under the influence of gravity, thus functioning as a pressure holding member as will be discussed hereinafter in further detail.

Configured within the disk member 130 there is an under pressure bleed valve designated 142 in the form of an aperture 146 centrally formed in said disk member 130 and disposed therein, and freely accommodating a movable member 148 having a cross-sectional T-shape loosely displaceable within the aperture 146. The movable member 148 is responsive to pressure differential and fluid flow rate between an open position, corresponding to the open position of the under pressure bleed valve 142, in which said aperture is open to facilitate fluid flow through the aperture 146, and a sealed position, corresponding to the sealed position of the under pressure bleed valve, in which the aperture is sealed by the movable member 148. The movable member 148 is a separate member which is mechanically disconnected from the disk member 130 and which is freely accommodated within the aperture 146. The movable member 148 has a head portion 150 and a main portion 147. The main portion 147 of the movable member 148 is characterized by an elongated shape and having a diameter which is smaller than the diameter of said aperture so as to allow passage of fluid therebetween. The head portion 150 has a diameter which is larger than the diameter of the aperture 146. In the sealed position of the under pressure bleed valve 142, the head portion 150 bears against a bottom surface of the disk member 130 and in the opened position the head portion 150 of the movable member 148 is displaced into a cavity 93 at the fluid outlet port 139 of the intermediate flow path 88, where it facilitates restricted fluid flow either through the aperture 146 of the disk member 130 or about boundaries of the disk member disk 130 and the sealing boundaries of the fluid outlet port surrounding it, as will be discussed hereinafter in further detail.

The disk chamber 86 is provided with a top cover 87 (removed in FIGS. 5 and 5) snappingly secured at the top end 89 of the inner capsule 48. The top cover 87 is provided with a plurality of apertures 91 (FIG. 3) facilitating fluid flow between the disk chamber 86 and the valve outlet 120 and to valve outlet port 122 respectively.

The valve 20 in accordance with the present disclosed subject matter is typically fitted in a fuel tank (not shown) of a vehicle (not shown) through an opening formed in the fuel tank, with the annular skirt 38 being attached to an outer surface of the fuel tank in a matter preventing fuel permeation therethrough. However, in accordance with another example, the valve 20 is articulated within the fuel tank by means of an attachment secured at the top portion 25 (FIG. 1) of the housing 24 and being secured (e.g. by snap type engagement, fusion welding, etc.) to an inner top surface of the fuel tank (not shown) whereby the need to form an aperture through the fuel tank is obviated.

The valve 20 of the present disclosed subject matter is thus fitted with a pressure holding member in form of the disk member disk 130 and an under pressure bleed valve in the form of the movable member 148 received within the aperture 146 of the disk member 130. Operation and functioning of the valve at different working conditions and its performance will now be discussed with further reference being made to the remaining figures.

At a regular state when the vehicle and respectively the valve are at substantially level and still position (i.e. the vehicle is not in motion), fuel is not consumed by the engine and the temperature (vehicle's environment and ambient) is not high so as to cause pressure rise within the fuel tank, or not too low so as to cause under pressure within the fuel tank, thus at this position the float member 54 is at its lowermost position owing to biasing effect of the coiled spring 56, wherein the fluid inlet port 94 and the valve inlet 85 are in fluid communication with each other. It is appreciated that the valve inlet 85 is constantly open and facilitates fluid flow and pressure equilibrium between the interior of the fuel tank and the float chamber 84. Further at this position of the float member 54, fuel vapor is able to flow to and from the flow chamber 84 via the valve outlet 122, according to different situations detailed below.

The valve according to the present disclosed matter is operative in several operative situations, as follows:

Under Pressure Position

Figure 5A:
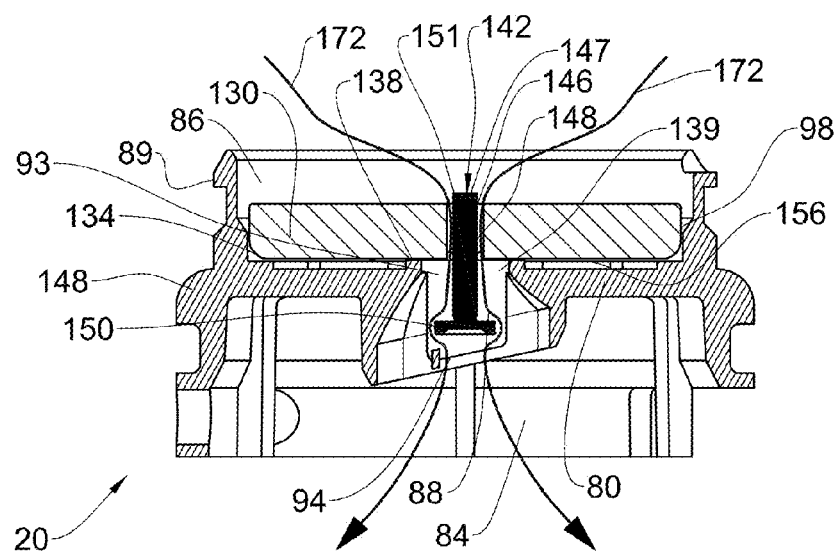
FIGS. 5A to 5C illustrate three respective positions of only the pressure-holding member and under-pressure bleed valve associated therewith, configured in a valve in accordance with the subject disclosed matter.
Figure 6A:
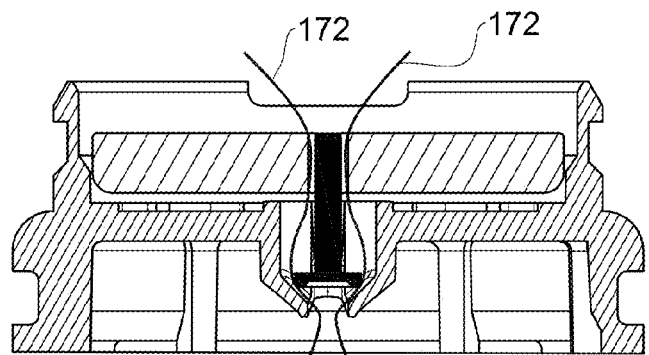
FIGS. 6A to 6E illustrate five respective functional states of only the pressure-holding member and under-pressure bleed valve associated therewith, configured in a valve in accordance with the subject disclosed matter; rotated about 90° with respect to FIGS. 5A to 5C.

The under pressure position as reflected in FIGS. 5A and 6A, respectively, may take place in extreme cold environment (e.g. at temperatures below about −20° C.) wherein the fuel tank may somewhat shrink and form under pressure within the fuel tank, wherein it is desired to allow inward bleeding of vapor, to prevent collapsing or cracking of the fuel tank. This position may also take place when fluid is pumped from the fuel tank causing under pressure therein.

At this position, the pressure holding member, namely the disk member 130 is at its downward position sealingly bearing against the annular disk seating 134 of the disk chamber 86 and wherein the movable member 148 is displaced to its downwards open position under force of gravity and owing to pressure differential over its bottom surface 150 and its top face 151. At this position fluid flow, namely fuel vapor is admitted to flow through the valve outlet 122, into the disk chamber 86, through the aperture 146 into the intermediate flow path 88 and then, through the float chamber 84 into the fuel tank, thus relieving the under pressure and allowing pressure equilibrium to take place within the fuel system, as represented schematically by arrowed line 172. At this position of the valve 20, the disk member 130 is positioned at its closed position in which fluid is not able to bleed between the disk member 130 and the sealing boundaries of the fluid outlet port 139.

It is noted that in accordance with a particular design at under pressure conditions i.e. pressure of −1 KPa, the flow rate is about 1-3 liters per minute.

Outlet Bleed Position

Figure 6B:
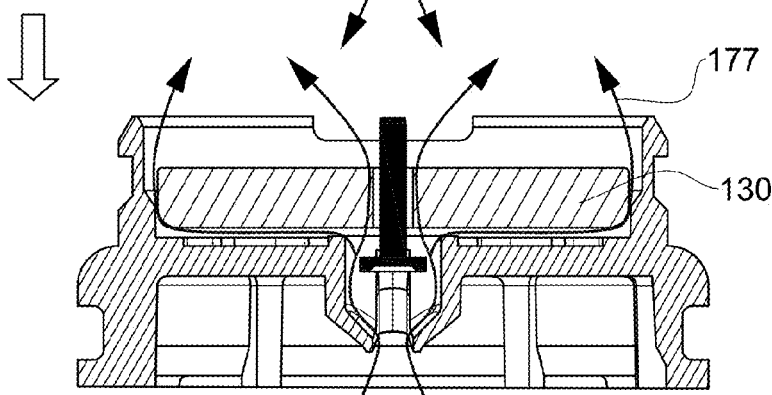

This position, as represented by FIG. 6B occurs whilst slight pressure builds up occurs within the fuel tank (not shown) and it is thus desired to discharge the pressure built. The disk member 130 of the pressure holding mechanism maintains a predetermined pressure within the fuel tank owing to its self-weight, whereupon it will displace upwardly at a predetermined pressure threshold (depending on its weight and bottom surface area). At this position the movable member 148 is displaced downwardly into the cavity 93 at the fluid outlet port 139 whilst at said predetermined pressure threshold the disk member 130 begins to oscillate permitting pressure bleed about the perimeter thereof at a rate of about 0.7 liter per minute and at a pressure of up to about 3 to 4 KPa. This situation, as mentioned above, allows for preventing over pressure buildup within the fuel tank and fuel vapor is thus allowed to discharge from the fuel tank, as represented by arrowed line 177 in FIG. 6B, at a flow rate of between 0 to 0.85 liters per minute, wherein the disk member 130 is still at its closed position while being slightly displaced from the annular disk seating 134, though it does not completely displace into its fully open position. It is further noticed, that in accordance with a particular design, the bottom edge 137 of the disk member 130 is curved or chamfered, thereby facilitating fluid flow thereabove even before complete raising of the disk member 130 into its fully opened position.

Transition Open Position

Figure 5B:
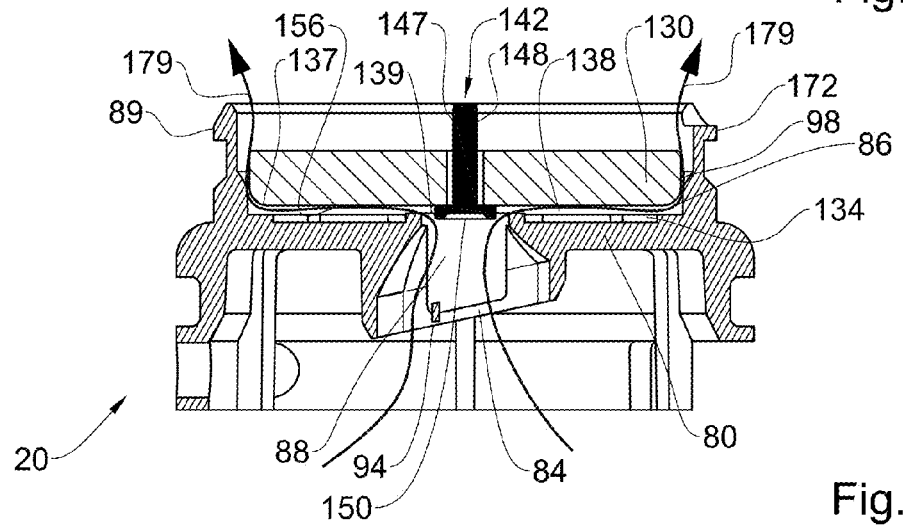
Figure 6C:
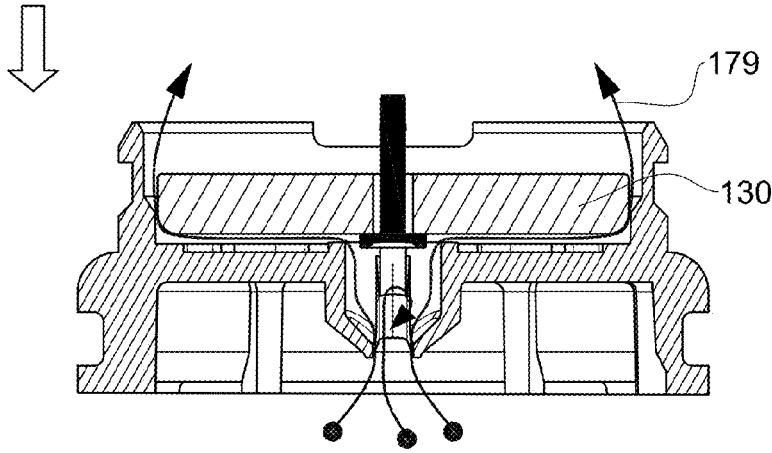

At this position, represented by FIGS. 5B and 6C respectively, the movable member 148 displaces into its upward position, namely sealing the aperture 146 of the pressure holding disk member 130, owing to pressure differential taking place over the bottom surface 150 of the T-shaped pin and its upper surfaces, as well as owing to a Venturi effect taking place within the aperture 146, resulting in upward displacement of movable member 148 into a position where it seals the aperture 146, whereby the disk member 130 is still at its oscillating position, namely allowing pressure discharge from the fuel tank, yet at a substantially low flow rate. This is represented by arrowed line 179. At this position fluid flow drops and the pressure increases to about ~0.5 KPa with a fluid flow lesser than about 0.5 liter per minute (referred to as 'crocking' position).

Fully Opened Position

Figure 5C:
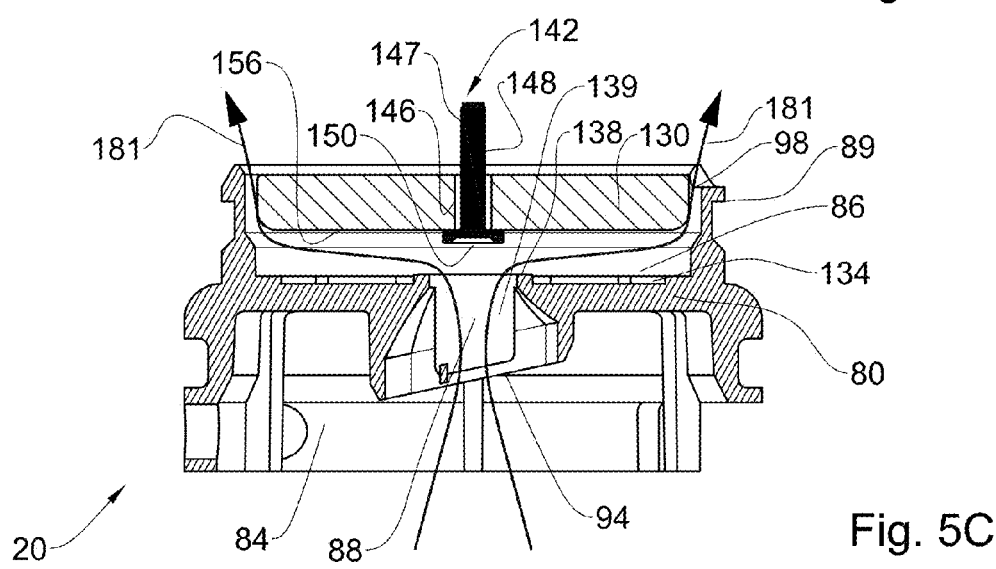
Figure 6D:
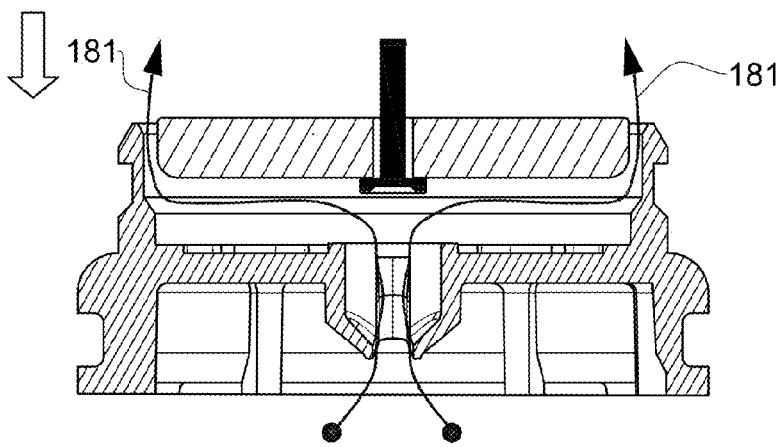

At this position, as represented by FIGS. 5C and 6D, the pressure holding mechanism, namely disk member 130 displaces to its fully open position to facilitate fluid discharge from the fuel tank and pressure discharge at substantially high pressures of about 5 KPa and at high fluid flow rates of 20 and even 30 or more liters per minute.

As noted in the figures, this position the movable member 148 of the under pressure bleed valve is at its sealed position bearing against the bottom surface 156 of the disk member 130 (owing to pressure differential and ventury effect as discussed hereinabove) and wherein massive fluid flow takes place about the peripheral edge of the disk member 130, as represented by arrowed lines 181.

It is appreciated that at all the respective positions mentioned above, the float member 54 is displaced from its closed, toward it biased position, as to thereby facilitate fluid flow through the flow chamber 84, according to a mechanism which is fully detailed in the U.S. Pat. No. 5,738,132.

The above positions are respectively represented also in the graphs of FIGS. 7A-B and 8A-B, according to one example of the presently disclosed valve.

Figure 7A:
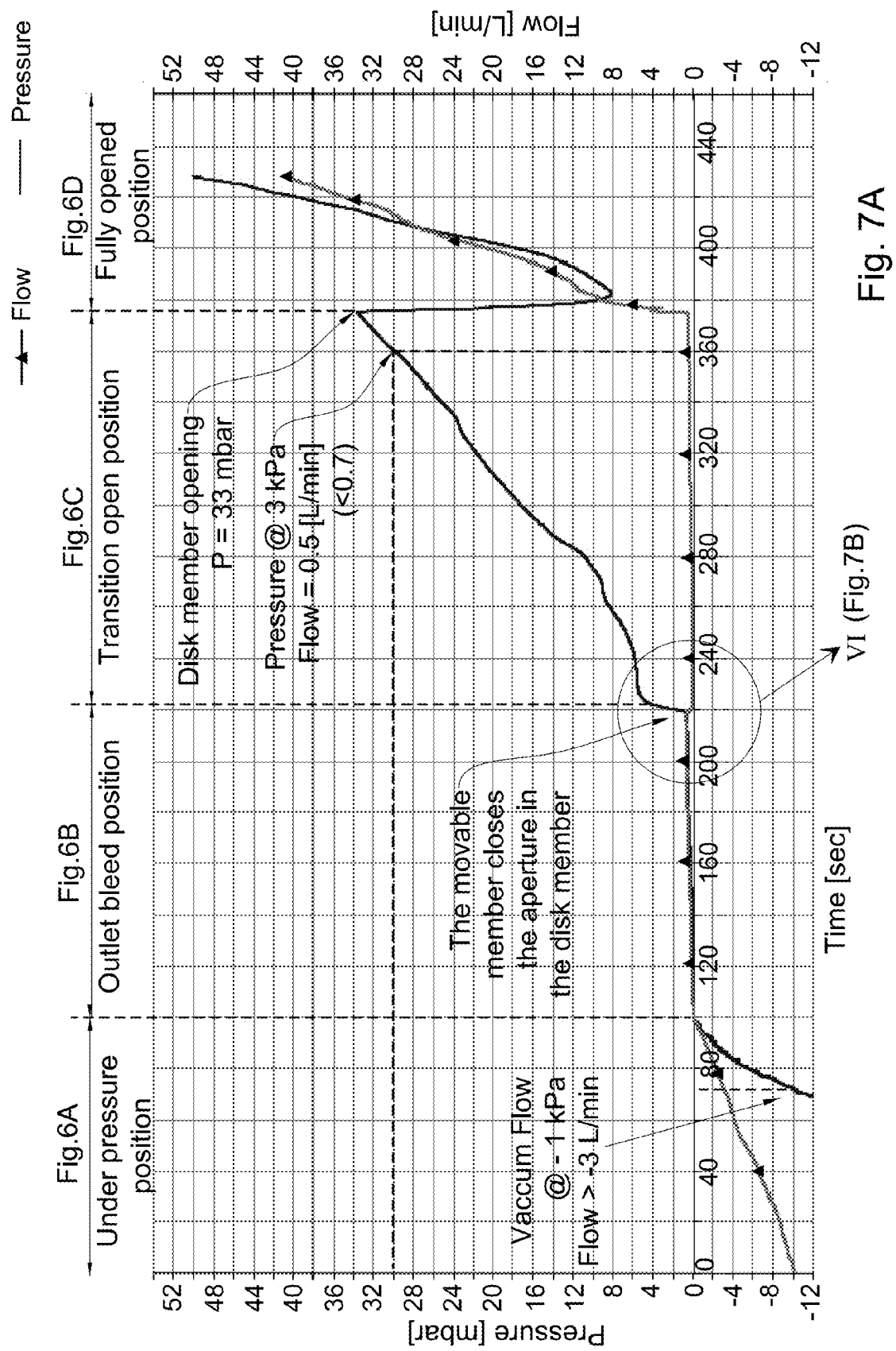
FIG. 7A is a graph representing flow characteristics of the valve subject of the present disclosed matter, namely flow & pressure versus time.
Figure 7B:
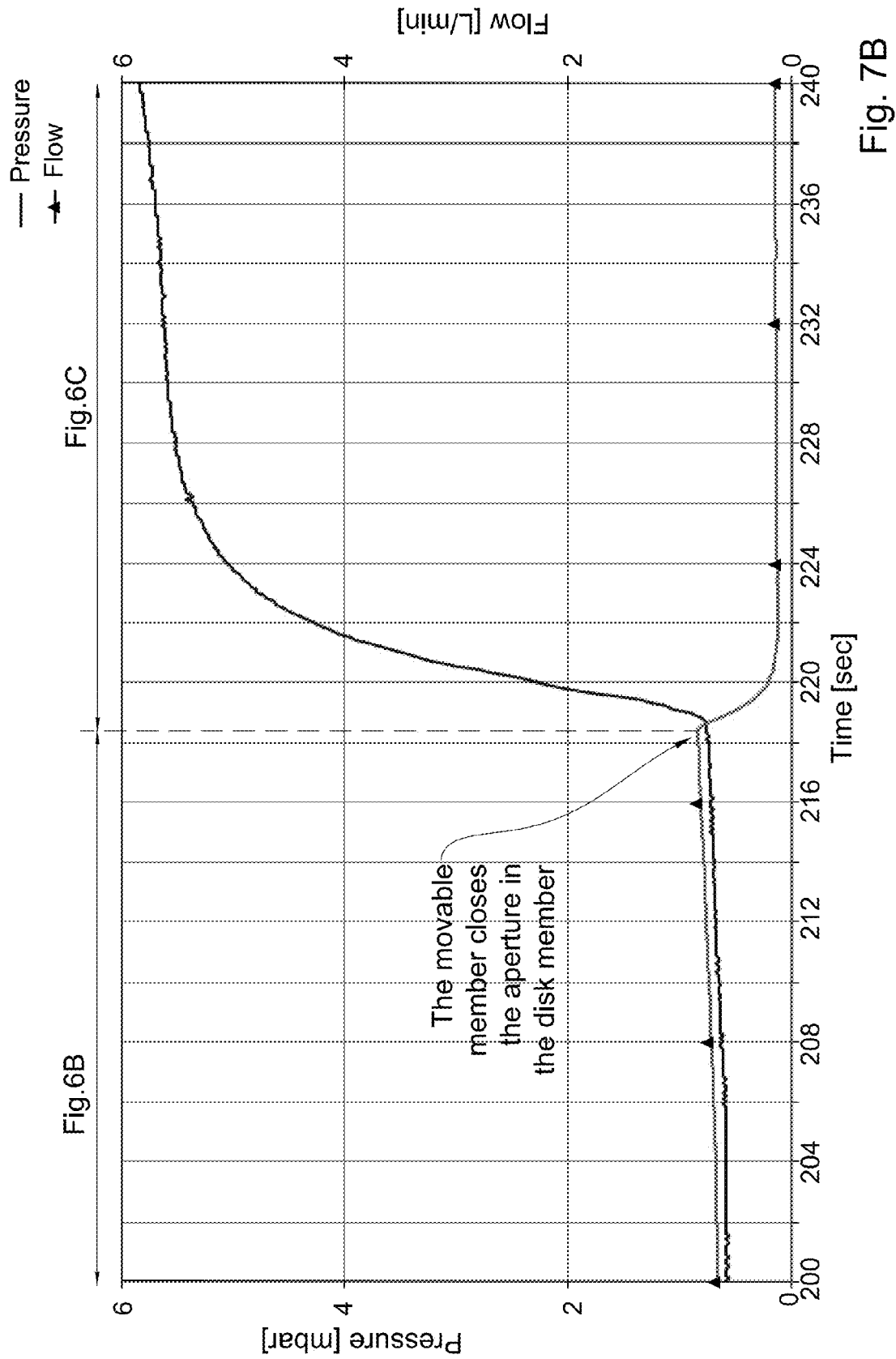
FIG. 7B is an enlargement of the portion marked VI in FIG. 7A.

FIGS. 7A-B represents the following two graphs: pressure vs. time, and flow v.s time. In the graph of FIG. 7A, there are four regions which are corresponding to the four positions of the valve (i.e., the Under pressure position, the Outlet Bleed position, the Transition Open Position, the Fully Opened Position) which are also illustrated in FIGS. 6A-D. The graph of FIG. 7B represents an enlarged portion of area VI in the graph of FIG. 7A in which the movable member 148 closes the aperture 146 of the sick member 130.

FIGS. 8A-B represent a graph of flow vs. pressure in which it can be seen how the flow of fluid through the valve changes as a result of change of pressure. In the graph of FIG. 8A, there are also four regions which are corresponding to the four positions of the valve (i.e., the Under pressure position, the Outlet Bleed position, the Transition Open Position, the Fully Opened Position) and which are also illustrated in FIGS. 6A-D. The graph of FIG. 8B represents an enlarged portion of area VII in the graph of FIG. 8A.

Figure 6E:
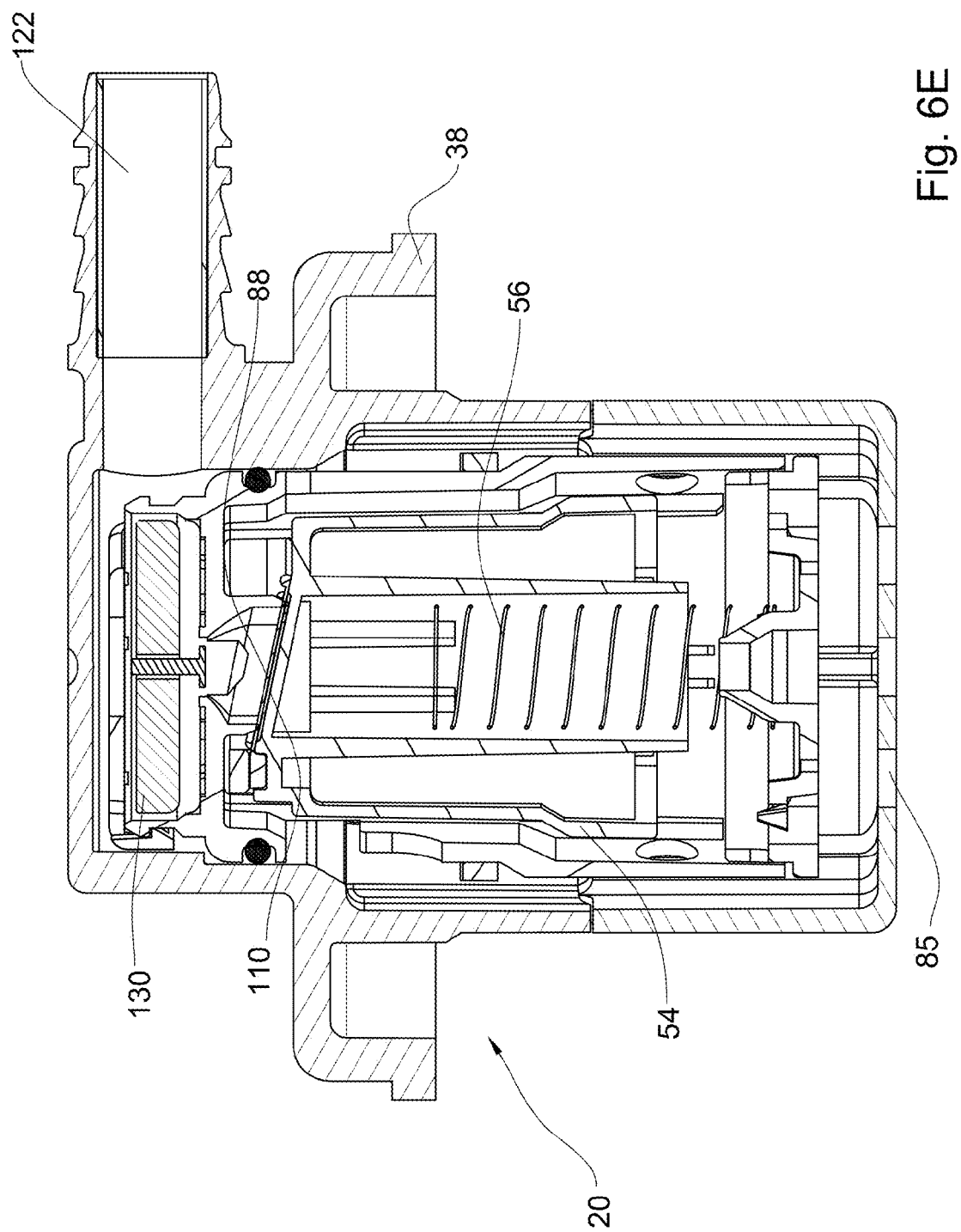

At yet another position, different from the four positions above, either as a result of over-filling of the fuel tank and consequent entry of fuel into the float chamber of the valve, the upward-directed buoyancy forces act on the float member 54, or as a consequence of partial or complete roll-over of the vehicle with the fuel tank, results in reduction of the downwardly-directed gravity forces, whereby the biasing effects of the compression spring 56 together result in displacement of the float member 54 into its closed (sealing) position as illustrated in FIGS. 3 and 6E, preventing fluid liquid discharge from the fuel tank through the valve (out towards the fuel treating device), which may be hazardous in such a case.

It is appreciated that displacement of the float member 54 from its closed, uppermost position to its open position takes place through a so-called pealing mechanism wherein the elongated flexible closure membrane strip gradually detaches from sealing engagement with the valve seating 100 of the fluid inlet port 94, to ensure that the fluid inlet port 94 opens, also at the existence of some gradual pressure within the fuel tank.

While there has been shown a preferred embodiment of the invention, it is to be understood that many changes may be made therein without departing from the spirit of the invention, Mutatis Mutandis. For example, the roll over valve function may be achieved by other valve types.

The invention claimed is:

1. A valve for a fuel tank comprising a housing configured with a float chamber and a disk chamber being in flow communication through an intermediate flow path; said float chamber configured with: a valve inlet which is in fluid communication with the fuel tank; and a fluid inlet port into said intermediate flow path; said disk chamber configured with a fluid outlet port from said intermediate flow path and a valve outlet; the fluid inlet port is sealable by a sealing member of a float member axially displaceable within the float chamber to selectively facilitate the fluid flow to or from the float chamber via the valve, and the fluid outlet port is sealable by a pressure holding member axially displaceable within the disk chamber to selectively facilitate fluid flow into or out of said fluid outlet port; said pressure holding member is configured with an under pressure bleed valve displaceable between a sealed position wherein the under pressure bleed valve is sealed, and an open position wherein the under pressure bleed valve is open, providing passage of fluid;

wherein the under pressure bleed valve is in a form of an aperture formed in the pressure holding member and a movable member displaceable within the aperture responsive to pressure differential and fluid flow rate between the open position, corresponding to the open position of the under pressure bleed valve, in which said aperture is open to facilitate the fluid flow through said aperture, and the sealed position, corresponding to the sealed position of the under pressure bleed valve, in which the aperture is sealed; wherein said movable member comprises a head portion and a main portion, the head portion being configured for sealing the aperture in said sealed position; and wherein in a regular state of the valve, the under pressure bleed valve is biased by gravity to the open position, in which said head portion projects away from the pressure holding member while concurrently the main portion is at least partially accommodated in the aperture.

2. The valve according to claim 1, wherein said movable member is a separate member which is mechanically disconnected from said pressure holding member.

3. The valve according to claim 1, wherein said movable member is freely accommodated within said aperture.

4. The valve according to claim 1, wherein said movable member is an inverted restricting pin having a cross-sectional T-shape.

5. The valve according to claim 1, wherein said head portion has a diameter which is larger than a diameter of the aperture.

6. The valve according to claim 1, wherein in said sealed position of the under pressure bleed valve, said head portion bears against a bottom surface of the pressure holding member.

7. The valve according to claim 1, wherein said main portion is characterized by an elongated shape and having a diameter which is smaller than a diameter of said aperture so as to allow passage of the fluid.

8. The valve according to claim 1, wherein in said open position of the under pressure bleed valve, said head portion is displaced downwardly, towards the intermediate flow path, to facilitates restricted fluid flow through said aperture of the pressure holding member.

9. The valve according to claim 1, wherein said under pressure bleed valve is disposed within said pressure holding member.

10. The valve according to claim 1, wherein the pressure holding member is a disk member displaceable within the disk chamber between a disk member open position providing passage about sealing boundaries of the disk member and a closed position in which the disk member rests over the sealing boundaries of the fluid outlet port, so as to selectively facilitate the fluid flow out of the fluid outlet port into the disk chamber.

11. The valve according to claim 10, wherein the valve has an under pressure position in which said disk member is disposed at the closed position of the disk member, preventing passage of the fluid about the sealing boundaries, and in which the under pressure bleed valve disk member is in the open position in which the under pressure bleed valve facilitates the fluid flow from the disk chamber through the under pressure bleed valve into the float chamber.

12. The valve according to claim 10, wherein the valve has an outlet bleed position in which said disk member is disposed at the closed position, providing fluid bleed about the sealing boundaries and in which the under pressure bleed valve is in the open position in which the under pressure bleed valve facilitates the fluid flow from the float chamber into the disk chamber through the under pressure bleed valve.

13. The valve according to claim 10, wherein the valve has a transition open position in which said disk member is disposed at its the closed position, providing fluid bleed about the sealing boundaries, and in which the under pressure bleed valve is in the sealed position.

14. The valve according to claim 10, wherein the valve has a fully opened position in which said disk member is disposed at the open position, providing fluid bleed about the sealing boundaries, and in which the under pressure bleed valve is in the sealed position.

15. The valve according to claim 1, wherein the float member is axially displaceable within the housing along a longitudinal axis, the sealing member of the float member is configured as an elongated flexible closure membrane strip anchored at one end to an end of the float member adjacent the fluid inlet port and at a portion offset with respect to the fluid inlet port.

16. The valve according to claim 15, wherein the float member is connected to a spring which is configured to displace the float member away from the fluid inlet port and detach the strip from sealing engagement with the fluid inlet port.

17. The valve according to claim 16, wherein said valve has a roll over position in which said float member is displaced toward the fluid inlet port and seals the fluid inlet port.

18. The valve according to claim 17, wherein the valve has at least one of an under pressure position, an outlet bleed position, a transition open position, and a fully opened position, and wherein in the respective said under pressure position, said outlet bleed position, said transition open position, and said fully opened position, said valve is not in said rollover position.

19. The valve according to claim 1, wherein under conditions of under pressure in said float chamber, said the movable member is maintained at said open position under force of gravity and owing to the pressure differential.

* * * * *